United States Patent

Wilkie

(10) Patent No.: US 9,123,047 B2
(45) Date of Patent: Sep. 1, 2015

(54) SYSTEM FOR PROVIDING DOCUMENT SERVICES USING A COUPON WITH A COUPON SCANNING DEVICE

(75) Inventor: Robert B. Wilkie, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2221 days.

(21) Appl. No.: 10/425,471

(22) Filed: Apr. 28, 2003

(65) Prior Publication Data

US 2004/0215510 A1  Oct. 28, 2004

(51) Int. Cl.
*G06Q 30/02* (2012.01)
*G06Q 20/34* (2012.01)
*G07F 7/02* (2006.01)
*G07F 17/00* (2006.01)

(52) U.S. Cl.
CPC .............. *G06Q 30/02* (2013.01); *G06Q 20/342* (2013.01); *G06Q 30/0225* (2013.01); *G07F 7/025* (2013.01); *G07F 17/0014* (2013.01)

(58) Field of Classification Search
USPC .................................................. 705/14, 14.1
See application file for complete search history.

(56) References Cited

U.S. PATENT DOCUMENTS

| | | | | |
|---|---|---|---|---|
| 4,519,088 A | * | 5/1985 | Rademacher et al. | 377/16 |
| RE32,115 E | * | 4/1986 | Lockwood et al. | 235/381 |
| 4,674,041 A | * | 6/1987 | Lemon et al. | 705/14 |
| 5,491,326 A | * | 2/1996 | Marceau et al. | 235/381 |
| 5,500,514 A | * | 3/1996 | Veeneman et al. | 235/381 |
| 5,737,491 A | * | 4/1998 | Allen et al. | 704/270 |
| 5,778,076 A | | 7/1998 | Kara et al. | 380/51 |
| 5,796,834 A | | 8/1998 | Whitney et al. | 380/25 |
| 5,818,606 A | * | 10/1998 | Muramatsu et al. | 358/405 |
| 5,845,259 A | * | 12/1998 | West et al. | 705/14.38 |
| 5,884,277 A | * | 3/1999 | Khosla | 705/14.26 |
| 5,979,757 A | * | 11/1999 | Tracy et al. | 235/383 |
| 6,175,823 B1 | * | 1/2001 | Van Dusen | 705/26 |
| 6,188,766 B1 | * | 2/2001 | Kocher | 380/246 |
| 6,223,166 B1 | | 4/2001 | Kay | 705/26 |
| 6,233,565 B1 | | 5/2001 | Lewis et al. | 705/35 |
| 6,233,568 B1 | | 5/2001 | Kara | 705/410 |
| 6,321,985 B1 | * | 11/2001 | Kolls | 235/381 |
| 6,328,339 B2 | * | 12/2001 | Dixon et al. | 283/52 |
| 6,373,587 B1 | | 4/2002 | Sansone | 358/1.15 |
| 6,408,286 B1 | * | 6/2002 | Heiden | 705/408 |
| 6,424,950 B1 | * | 7/2002 | Weller | 705/50 |

(Continued)

FOREIGN PATENT DOCUMENTS

| | | |
|---|---|---|
| JP | 2001-351001 | 12/2001 |
| JP | 2002117307 A | 4/2002 |

(Continued)

OTHER PUBLICATIONS 2001-2002 Access Controls International, product and services publication.

(Continued)

*Primary Examiner* — Jami A Plucinski
*Assistant Examiner* — Rodney Henry
(74) *Attorney, Agent, or Firm* — Gibb & Riley, LLC

(57) ABSTRACT

A system and method for providing access to and gaining access to document services using a printed coupon. The printed coupon contains one or more machine-readable symbols describing the document services to which a holder of the coupon is entitled. The document services include faxing, printing, copying, email, electronic file access, scan to email, scan to file and document services.

19 Claims, 5 Drawing Sheets

(56) References Cited

U.S. PATENT DOCUMENTS

| | | | |
|---|---|---|---|
| 6,429,946 B1* | 8/2002 | Bresnan et al. | 358/1.15 |
| 6,491,217 B2* | 12/2002 | Catan | 235/375 |
| 6,574,373 B1* | 6/2003 | Morba et al. | 382/254 |
| 6,636,837 B1* | 10/2003 | Nardozzi et al. | 705/27 |
| 6,766,301 B1* | 7/2004 | Daniel et al. | 705/14.26 |
| 6,816,838 B1* | 11/2004 | Ryan, Jr. | 705/14.66 |
| 6,871,784 B2* | 3/2005 | Jayaratne | 235/449 |
| 6,889,202 B2* | 5/2005 | Johnson et al. | 705/26 |
| 7,062,474 B1* | 6/2006 | Reiter | 705/408 |
| 7,093,130 B1* | 8/2006 | Kobayashi et al. | 713/176 |
| 7,162,449 B2* | 1/2007 | Drummond et al. | 705/43 |
| 7,243,153 B2* | 7/2007 | McIntyre et al. | 709/229 |
| 2001/0001145 A1* | 5/2001 | Barnett et al. | 705/14 |
| 2002/0046195 A1* | 4/2002 | Martin et al. | 705/401 |
| 2002/0082993 A1* | 6/2002 | Hoyos et al. | 705/43 |
| 2002/0169623 A1* | 11/2002 | Call et al. | 705/1 |
| 2003/0038971 A1* | 2/2003 | Renda | 358/1.16 |
| 2003/0074325 A1* | 4/2003 | Ryan, Jr. | 705/60 |
| 2003/0078893 A1* | 4/2003 | Shah et al. | 705/60 |
| 2003/0117635 A1* | 6/2003 | Roberts | 358/1.2 |
| 2004/0049422 A1* | 3/2004 | Mortimer | 705/14 |
| 2004/0095604 A1* | 5/2004 | Meyerhofer | 358/1.18 |
| 2004/0139007 A1* | 7/2004 | Singh et al. | 705/39 |
| 2004/0199545 A1* | 10/2004 | Wagner et al. | 707/104.1 |
| 2004/0215510 A1* | 10/2004 | Wilkie | 705/14 |
| 2005/0211764 A1* | 9/2005 | Barcelou | 235/379 |
| 2006/0032924 A1* | 2/2006 | Huston et al. | 235/462.05 |

FOREIGN PATENT DOCUMENTS

| | | |
|---|---|---|
| JP | 2002170028 A | 6/2002 |
| JP | 2002189945 A | 7/2002 |
| JP | 2003-76911 | 3/2009 |
| WO | WO 00/73954 A2 | 12/2002 |

OTHER PUBLICATIONS

Altman Technologies Intelligent Software Solutions, product and services publication.
Print Vending.com, product and services catalog.
Robert Wilkie, JP2004-133073, Japanese Office Action and Partial Translation, Nov. 10, 2009.

* cited by examiner

SYSTEM FOR PROVIDING DOCUMENT SERVICES USING A COUPON WITH A COUPON SCANNING DEVICE

INCORPORATION BY REFERENCE OF OTHER U.S. PATENTS

The application hereby incorporates by reference the disclosures of Ronald L. Rivest et al. "Cryptographic communications system and method," U.S. Pat. No. 4,405,829, Dan S. Bloomberg et al., "Adaptive scaling for decoding spatially periodic self-clocking glyph shape codes," U.S. Pat. No. 5,091,966, Xiao B. Zhang, "Self-clocking glyph code for encoding dual bit digital values robustly," U.S. Pat. No. 5,245,165, David L. Hecht, "Exclusive or cross-coupled framing codes for self-clocking glyphs," U.S. Pat. No. 6,340,118, Theodosios Pavlidis et al., "High density two-dimensional bar code symbol," U.S. Pat. No. 5,304,786, and Frederick Schuessler et al., "Two-dimensional bar code symbology using implicit version information encoding," U.S. Pat. No. 6,047,892, verbatim and with the same effect as though such disclosures were fully and completely set forth herein.

TECHNICAL FIELD

This invention relates to a method of authorizing document services to be provided by a document services device with a coupon scanning device.

BACKGROUND OF THE INVENTION

It is often desirable to control access to devices and computer systems that provide document services. By document services, it is meant the capabilities and facilities for the processing and manipulation of documents, whether in digital or hardcopy form. Examples of document services comprise printing, copying, faxing, electronic mail, electronic file access, scanning and document processing. An example of a document processing service is optical character recognition.

Numerous approaches have been developed to control access to devices and computer systems that provide document services. These approaches include key-cards, biometric access control systems, traditional computer and network authentication systems such as password access control and device access lists, and coin-boxes requiring payment, and hence de facto authorization for access, at the point of need.

However, these approaches do not readily provide a mechanism to simply, rapidly and cost-effectively provide access to document services on one or more devices while still providing a simple means for distribution of the document-services access mechanism and the centralized management of document services access.

Therefore, there is a need for an improved method for providing access to document services.

SUMMARY OF THE INVENTION

In a first aspect of the invention there is a method of providing at least one document service to a user, comprising: dispensing a coupon to the user, the coupon bearing at least one indicium that represents at least one document service that the user is entitled to; scanning the coupon to decode the at least one indicium to determine the, at least one, document service; and, providing the, at least one, document service to the user.

In a second aspect of the invention there is a system for providing at least one document service to a user, comprising: means for dispensing a coupon to the user, the coupon bearing at least one indicium that represents at least one document service that the user is entitled to; means for scanning the coupon to decode the at least one indicium to determine the, at least one, document service; and, means for providing the, at least one, document service to the user.

In a third aspect of the invention there is a system for dispensing a coupon to a user, the coupon bearing at least one indicium that represents at least one document service that the user is entitled to, comprising: means for encoding information that represents the at least one document service that the user is entitled to; means for delivering the coupon to a marking device; and, means for marking the coupon.

In a fourth aspect of the invention there is provided a system for redeeming a coupon bearing at least one indicium that represents at least one document service that the user is entitled to, comprising: means for scanning the coupon; means to decode the indicium to determine the, at least one, document service; and, means for providing the, at least one, document service to the user.

BRIEF DESCRIPTION OF THE DRAWINGS

FIG. 5 and FIG. 6 depict a first embodiment of a method of buying and selling document services. Also FIG. 5 and FIG. 6 depict a first embodiment of a method for forming and decoding a coupon for providing access to document services.

DETAILED DESCRIPTION OF THE INVENTION

Figure 1:
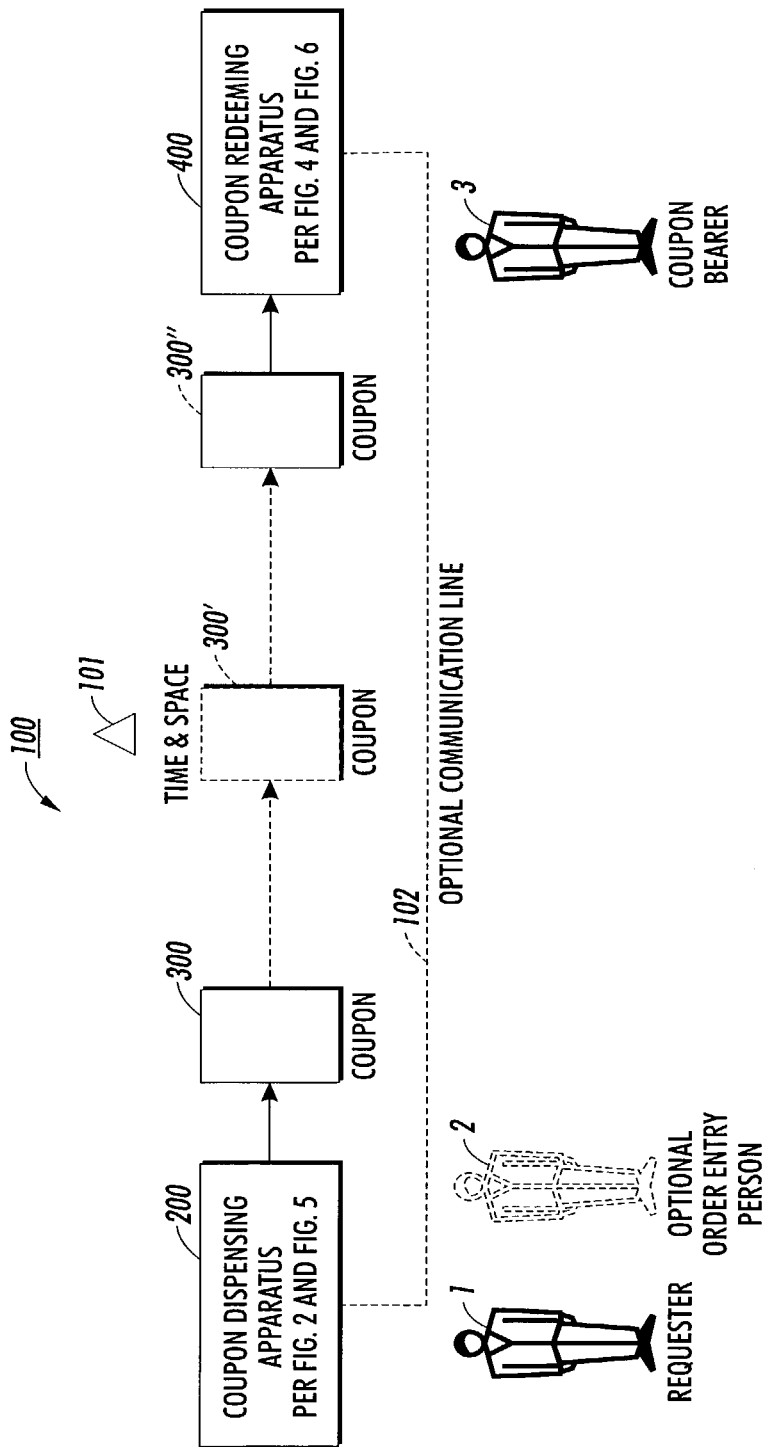
FIG. 1 is a block diagram depicting a system 100 for providing document services, a system 100 for buying and selling document services, and a system 100 for forming and decoding a coupon for providing access to document services in accordance with the invention. The system 100 can also be used to demonstrate a method for providing document services, a method for buying and selling document services, and a method for forming and decoding a coupon for providing access to document services. As shown, the system 100 comprises a coupon dispensing apparatus 200 arranged for providing a coupon 300, and a coupon redeeming apparatus 400 for redeeming the coupon 300". A requester 1 requests access to document services. As further described with reference to FIG. 2, the request is entered into the coupon dispensing apparatus 200. An optional order entry person 2 may enter the request into coupon dispensing apparatus 200 on behalf of the requester 1. Optionally, there may be a time and space transition, 101 whereby the dispensed coupon 300 is transferred to a coupon bearer 3 and the coupon redeeming apparatus 400. The coupon bearer 3 may be identical to the requester 1. As further described with reference to FIG. 4 the coupon bearer 3 redeems the coupon 300" using coupon redeeming apparatus 400 to gain access to the requested document services. Optional communication line 102 provides for operative communications capabilities between coupon dispensing apparatus 200 and coupon redeeming apparatus 400.

Referring to FIG. 1, there is shown a block diagram depicting a system for providing document services, a system for buying and selling document services, and a system for forming and decoding a coupon for providing access to document services. As shown, the system 100, comprises a coupon dispensing apparatus 200, arranged for providing a coupon 300, and a coupon redeeming apparatus 400 for redeeming the coupon 300", and a time and space transition 101 whereby the dispensed coupon 300' is transferred to the coupon redeeming apparatus 400.

Still referring to FIG. 1, a requester 1, requests access to one or more document services. By document services, we mean capabilities and facilities for the processing and manipulation of documents, whether in digital or hardcopy form. By way of example and not limitation document services comprise printing, copying, faxing, electronic mail, electronic file access, scanning and document processing. By way of example and not limitation, document processing comprises services such as optical character recognition.

The request is entered, either by the requester 1, or optionally by an order entry person 2, into the coupon dispensing apparatus 200, which is described in more detail with reference to FIG. 2 and FIG. 5. The coupon dispensing apparatus 200 dispenses a coupon 300, as described in more detail with reference to FIG. 3, bearing at least one indicium that represents at least one document service that a user is entitled to.

Again referring to FIG. 1, there is optionally a space and/or time transition in which the coupon 300' is then transferred to coupon bearer 3. The coupon bearer 3 redeems the coupon 300" using coupon redeeming apparatus 400 to gain access one or more of the requested document services. In one embodiment, the coupon bearer 3, is the same individual as the requester 1. As further described with reference to FIG. 4 and FIG. 6, the coupon redeeming apparatus 400 scans the coupon 300" to decode the at least one indicium to determine the permitted, at least one document service, and optionally document service features, and provide the at least one document service to the coupon bearer 3.

Still referring to FIG. 1, coupon dispensing apparatus 200 and coupon redeeming apparatus 400 optionally, may be in operative communication using optional communication line 102, as will be explained in more detail with reference to FIG. 2 and FIG. 4.

Figure 2:
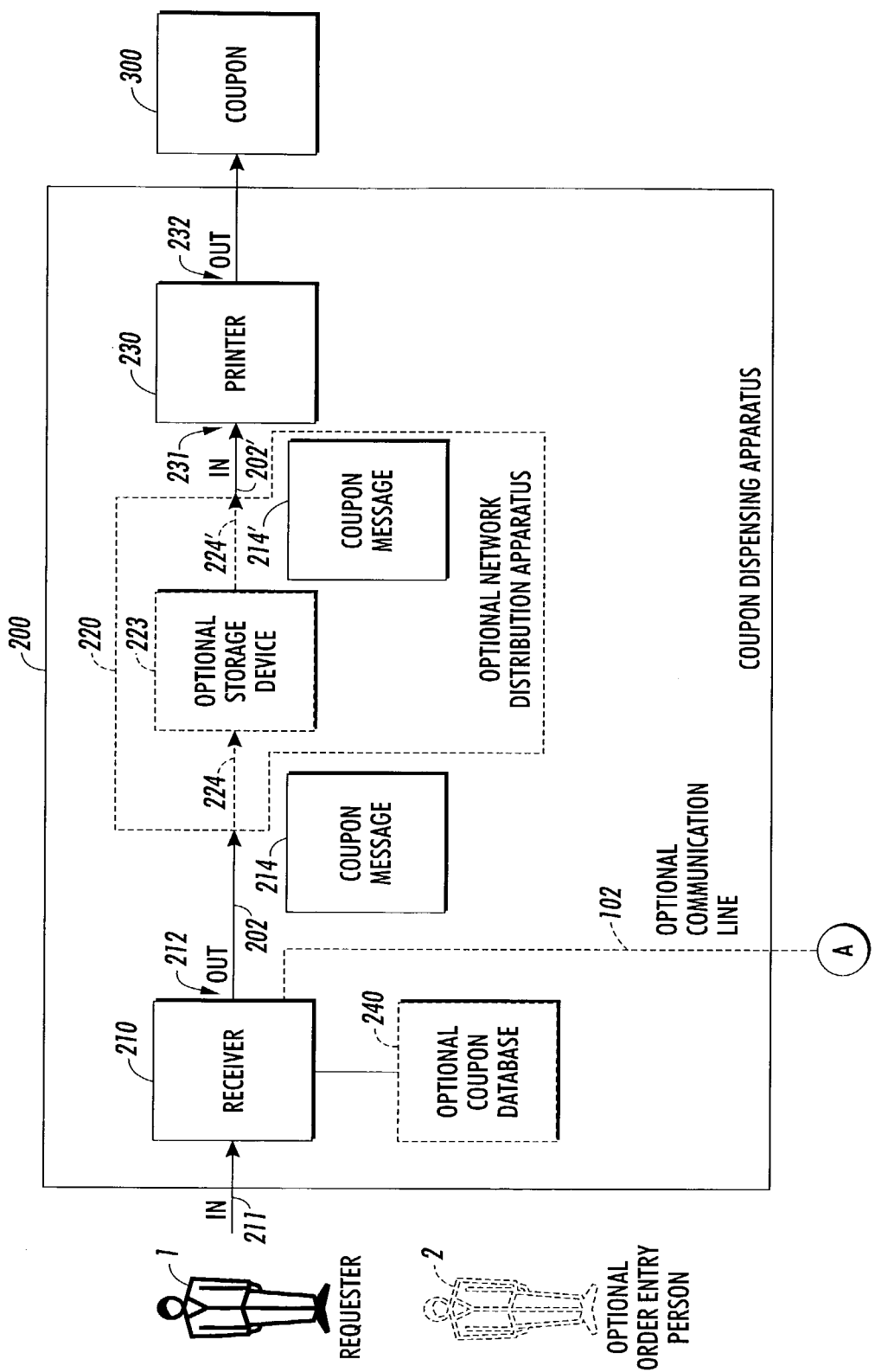
FIG. 2 provides further detail for the FIG. 1 coupon dispensing apparatus 200. The coupon dispensing apparatus 200 comprise a receiver 210 for receiving the request for document services. The receiver 210 encodes the document services request to form a coupon message 214 and transmits the coupon message 214 via communications pathway 202-202' to printer 230, which prints and dispenses coupon 300. The communications pathway 202-202' may include optional network distribution apparatus 220, comprising communication pathway 224-224' and optional storage device 223. The coupon dispensing apparatus 200 may further comprise optional coupon database 240. Optionally, the receiver 210 may be in operative communication with the coupon redeeming apparatus (reference FIG. 1, 400) via optional communication line 102.

Referring now to FIG. 2, the coupon dispensing apparatus 200 is described in detail. The requester 1 makes a request for access to the desired document services. In one embodiment, the request is a verbal description of the requested document services that is made to order entry person 2. Order entry person 2 physically enters the request into the input 211 of receiver 210, as described in more detail below. In an alternative embodiment, the request is made via electronic communication, such as electronic mail, to an order entry person 2 who physically enters the request into the input 211 of receiver 210. In another alternative embodiment the requester 1 physically enters the request into input 211 of the receiver 210.

Still referring to FIG. 2, in one embodiment, the receiver is a computer, such as an Intel based personal computer configured with the Microsoft™ operating system. The request is entered into the input 211 of receiver 210 using one of several data entry methods, as are well known to one skilled in the art. Such data entry methods, corresponding to alternative embodiments of input 211, may include keyboard entry, touch screen and voice recognition. In an alternative embodiment, the receiver 210 is a server that may be accessed via one of several well-known network protocols such as the hypertext transfer protocol (HTTP) and the transport control protocol/internet protocol (TCP/IP). The server provides a graphical user interface for entry of the request via presentation of hypertext markup language (HTML) based data entry forms.

Still referring to FIG. 2, in one embodiment, the receiver 210 stores the request in a coupon database 240. The creation and use of databases is well know to those skilled in the art.

Again referring to FIG. 2, in one embodiment the data associated with each request is organized in a data unit referred to as a record. The record comprises information describing the requested document services. In one embodiment, the record is further composed of one or more keys, each key providing a portion of the information making up the record.

Referring now to Table 1, there is shown one arrangement for the keys associated with the record, each key being identified by number and name. As shown, there are individual keys; each corresponds to a datum for representing one aspect of the document services and/or document service features requested by the requester 1. As also shown in Table 1, for each key there is a corresponding set of allowed parameter values indicating the allowed document services and/or document service features that a bearer of the corresponding coupon is entitled to. Also shown in Table 1, are individual keys that can be used for account management and coupon authentication, as described in more detail below.

TABLE 1

Coupon Key Values and Data Structures

| Key # | Data Structure | Key Name | Description |
|---|---|---|---|
| 1 | 32-bit integer | Number of Images | The maximum number of images that can be made. |
| 2-a | 8-bits | Unit of Measure for maximum paper size | 1 = inches<br>2 = cm<br>3 = mm |
| 2-b | two 32-bit integers | Maximum Paper Size | The maximum width and length of the paper that can be used. A 0 indicates no limit. |
| 2-c | 32-bit integer | Maximum Digital Size | The maximum size of any single image in kilobytes. A 0 indicates no limit. |
| 3-a | 8-bits | Unit of Measure for minimum paper size | 1 = inches<br>2 = cm<br>3 = mm |
| 3-b | two 32-bit integer | Minimum Paper Size | The minimum width and length of the paper that can be used. A 0 indicates no limit. |
| 3-c | 32-bit integer | Minimum Digital Size | The minimum size of any single image in kilobytes. A zero (0) indicates no limit. |
| 4-a | 64-bit integer | Starting Time | The time at which the coupon becomes valid in Epoch Time units - the number of seconds since Jan. 1, 1970. A 0 indicates no limitation on start time. |
| 4-b | 64-bit integer | Ending Time | The time at which the coupon expires in Epoch Time units - the number of seconds since Jan. 1, 1970. A 0 shall indicate no limitation on expiration time. |
| 5-a | 2-bits | Scan to File | 1 = permitted, 0 = disallowed. |
| 5-b | 2-bits | Scan to Email | 1 = permitted, 0 = disallowed. |
| 5-c | 2-bits | Fax | 1 = permitted, 0 = disallowed. |
| 6-a | 8-bits | Stapling Options | The number of staples allowed for each document in a copy/print job. |
| 6-b | 8-bits | Folding Options | A number indicating how many folds are permitted in each sheet of paper in a print/copy job. I.e.,<br>0 = no folds<br>1 = one fold<br>2 = two folds |
| 6-c | 8-bits | Through-Hole Options | A number indicating how many through-holes are permitted in each document of a print/copy job. I.e.,<br>0 = no holes<br>1 = one hole<br>2 = Two holes |
| 6-d | 2-bits | Booklet Making | 1 = permitted, 0 = disallowed. |
| 6-e | 2-bits | Cover Pages | 1 = permitted, 0 = disallowed. |
| 6-f-1 | 2-bits | Watermarks Enabled | 1 = permitted, 0 = disallowed. |
| 6-f-2 | 256 byte string | Watermark Location | An ASCII string indicating the location from which to retrieve watermark. If this value is blank, the default watermark set on the device shall be used. |
| 6-g | 8-bits | 1-N up | A number indicating the maximum number of images that can be placed on a single piece of paper as part of a copy/print job. |
| 6-h | 2-bits | Duplexing | 0 = disallowed<br>1 = permitted |
| 6-i | twenty 32-bit integers | Page Inserts | Pages numbers for which a blank page may be inserted into a copy/print job. |

TABLE 1-continued

Coupon Key Values and Data Structures

| Key # | Data Structure | Key Name | Description |
|---|---|---|---|
| 7 | 64-bit integer | Paper Color Selection | A number indicating which color paper types may be used by the coupon holder. 0 = all colors 1 = white paper only 2 = transparency |
| 8-a | 256 byte string | User Name | User name as ASCII string |
| 8-b | 256 byte string | Company Name | Company name as ASCII string |
| 8-c | 256 byte string | Account | Account as ASCII string |
| 9 | 256 byte string | Header | Header to be printed on each page associated with print/copy/fax job. ASCII string. |
| 10 | 256 byte string | Footer | Footer to be printed on each page associated with print/copy/fax job. ASCII string. |

Still referring to Table 1, in this representative embodiment, the scanning and printing document services are permitted as the base set of allowed document services. Other document services that may be provided to the user, include scan to file (Key 5-a), scan to email (Key 5-b) and facsimile (Key 5-c). As one skilled in the art would recognize, other or alternate document services could provided in accordance with the current invention.

Again referring to Table 1, there are keys describing the permitted document service features a user can use in association with the allowed document services. Features that can be selected include: the maximum number of images the user is allowed to make (Key 1), the maximum paper size (Key 2-a and Key 2-b); the maximum size of any digital image that is used (Key 2-c); the minimum paper size (Key 3-a and Key 3-b); the minimum size of any digital image that is used (Key 3-c); the time period during which the user may use the permitted document services (Key 4-a and Key 4-b); the number of staples allowed for each document in a print/copy job (Key 6-a), folding options (Key 6-b), through-hole options (Key 6-c), whether booklet making is allowed (Key 6-d), whether cover pages are allowed (Key 6-e); whether and what digital watermark may be printed as a background image on each page of any print capable document services (Key 6-f-1 and Key 6-f-2); the maximum number of images that can be printed on a single page of any print capable document service (Key 6-g), whether one or both sides of a paper may be printed upon, (also known as simplex and duplex printing respectively) (Key 6-h); the page numbers, when printing or copying a document, for which blank pages may be inserted (Key 6-i); the allowed selections of color stock for printing (Key 7); the selection of a one-line header to be printed on the top of each page that is printed by any print capable document service (Key 9), and the selection of a one-line header that is to be printed on each page that is printed with any print capable document service (Key 10). Booklet making is the feature wherein a printed document is bound. An example of booklet making is provided with the DocuTech 135 available from Xerox Corporation, 800 Long Ridge Road, Stamford Conn. 06904. A cover page is a page that is inserted as the first page of a document as part of copying or printing a document. As one skilled in the art would recognize, other or alternate document service features could be provided in accordance with the current invention.

Still referring to Table 1, there are shown keys that may be used in association with identifying and managing accounts: a user name (Key 8-a), a company name (Key 8-b) and an account identifier (Key 8-c). These keys, singly, or in combination, may be used to assign account identifier information to a group comprising one or more users, and track the purchase and/or usage of document services by the account identifier information. As one skilled in the art would recognize, other or alternate keys could be used for the purpose of identifying, tracking and managing accounts in accordance with the current invention.

Referring again to FIG. 2, in an alternative embodiment the receiver 210 in addition to storing each request in optional coupon database 240, stores coupon identification information, such coupon identification information being unique to each coupon sold. Coupon identification information may comprise the time and place the coupon was sold, information derived from one or more keys associated with the request record, a unique coupon identification number, or any number of schemes that are well known to those skilled in the art. In a further embodiment, the receiver 210 further maintains status information in the coupon database 240 associated with each coupon. The status information identifies which document services associated with a coupon have been used. In one embodiment, as will be described with reference to FIG. 4, the receiver 210 updates the status information based upon information provided by the coupon redeeming apparatus (reference FIG. 1, 400) via optional communication line 102. Optional communication line 102 may be a LAN network, wireless network, or dedicated signal line. In this manner the coupon dispensing apparatus 200 is able to track the document services used and/or purchased for individual users, and/or users associated with an account identifier. In one embodiment the coupon dispensing apparatus 200 provides a report of the document services purchased and/or used for individual users, and/or users associated with an account identifier.

Referring again to FIG. 2, in one embodiment, the receiver 210 also provides means for payment of purchased document services. In one embodiment means for payment may include entry of account identifier information. In an alternative embodiment the means for payment may comprise entry of credit card information. In one embodiment, the credit card information is entered by the same data entry means used for entering other data associated with the request. In an alternate embodiment, the input 211 of receiver 210 further comprises a credit card scanning device. Credit card scanning devices are well known to those skilled in the art.

Still referring to FIG. 2, the receiver 210 encodes the data associated with the request in a format suitable for creating the indicium of coupon 300. In one preferred embodiment, the indicium is a PDF417 bar code. The PDF417 bar code is well known to those skilled in the art. The utilization of PDF417 is taught in U.S. Pat. Nos. 5,304,786 and 6,047,892 incorporated by reference for their disclosure. In another embodiment, the indicium is a dataglyph. The utilization of dataglyphs is taught in U.S. Pat. Nos. 5,448,375, 5,459,307, and 5,486,686 all of which are incorporated by reference for their disclosure.

Still referring to FIG. 2, in an alternative embodiment, the receiver 210 encrypts the data associated with the request prior to encoding the data for printing the indicium of coupon 300. In a preferred embodiment, the request is encrypted with a 64 bit key using Pretty Good Privacy (PGP), a public key encryption method originally developed by Phil Zimmerman in 1991. PGP encryption is well known to those skilled in the art. As will be recognized to one skilled in the art, other encryption methods could be used in accordance with the current invention.

Still referring to FIG. 2, the receiver 210 forms a coupon message 214. The coupon message is a digital representation of the coupon. A variety of formats for the coupon message 214 are well known to those skilled in the art. Suitable formats for the coupon message 214 include the Adobe PostScript™ language and the Hewlett Printer Control Language (PCL). PostScript is a trademark registered to Adobe Systems Incorporated Corporation, 1585 Charleston Road, Mountain View Calif., 94039. The Adobe PostScript™ Language is described in "ADOBE POSTCRIPT LANGUAGE REFERENCE ($3^{RD}$ EDITION)," copyright 1999, Adobe Systems Incorporated by Addison-Wesley, Reading Mass., hereby incorporated in its entirety for its disclosure. The Hewlett Packard Printer Control Language is described in "PCL 5 PRINTER LANGUAGE TECHNICAL REFERENCE MANUAL EDITION 1" copyright 1992 by Hewlett-Packard, Manual Part No. 5961-0509 and "PCL5 PRINTER LANGUAGE TECHNICAL REFERENCE MANUAL EDITION 1," copyright 1992 by Hewlett-Packard, Manual Part No. 5961-0509 available from Hewlett-Packard, 3000 Hanover Street Palo Alto, Calif. 94304-1185, which are hereby incorporated in their entirety for their disclosure. The receiver 210 transmits the coupon message 214 via communications pathway 202-202' to printer 230. As will be recognized to one skilled in the art, other message formats could be used in accordance with the current invention.

Still referring to FIG. 2, in one embodiment, communications pathway 202-202' comprises a printer cable that directly connects the receiver 210 to the input 231 of printer 230. Printer 231 receives the coupon message 214 and prints, or marks, the coupon 300, dispensing the coupon 300 via the printer 230 output 232.

Referring again to FIG. 2, in an alternative embodiment the communications pathway 202-202' comprises a network connecting the output 212 of receiver 210 to the input 231 of printer 230. Again, printer 231 receives the coupon message 214 and prints, or marks, the coupon 300, dispensing the coupon 300 via the printer 230 output 232.

Referring again to FIG. 2 in an alternative embodiment the communications pathway 202-202' is in operative communications with optional network distribution apparatus 220. Optional network distribution apparatus 220 comprises network communications pathway 224-224' and coupon storage device 223. Representative embodiments of communications pathway 224-224' comprise LAN networks and wireless networks. Representative embodiments of the coupon storage device 223 comprise a computer, personal digital assistant (PDA) and cell phone. The receiver 210 transmits the coupon message 214 via communications pathway 202, which is in operative communication with communications pathway 224. The coupon message 214 is stored in coupon storage device 223. In a representative embodiment, the coupon storage device 223 would be accessible by requester 1 or coupon bearer (reference FIG. 1, 3). At some later point, requester 1, or coupon bearer (reference FIG. 1, 3). transmits coupon message 214' via communications pathway 224', in operative communication with communications pathway 202' to printer 230. Printer 230 receives the coupon message 214' via input 231 and prints, or marks, the coupon 300, dispensing the coupon 300 via the printer 230 output 232.

Figure 3:
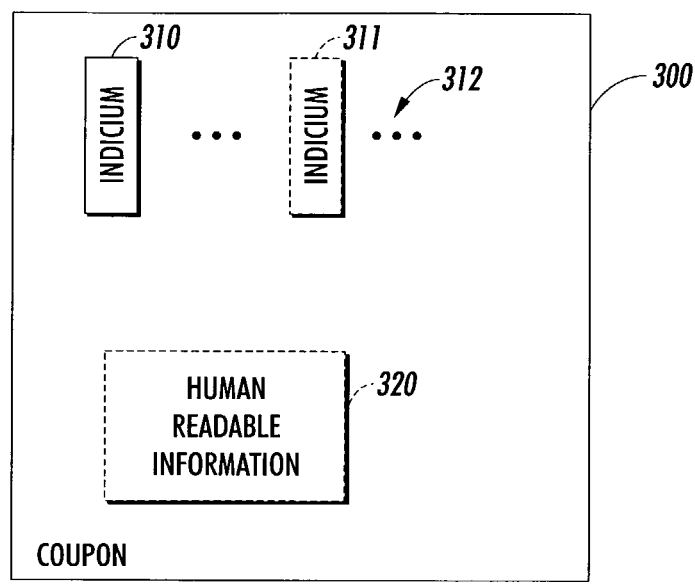
FIG. 3 provides further detail for the FIG. 1 coupon 300. The printing, or marks, on the coupon comprise a machine-readable symbol or indicium 310. The machine-readable indicium 310 is an encoding of information that comprises a description of the permitted document services and, optionally, specific document service features that a bearer of the coupon is entitled to. In accordance with the invention, the coupon optionally, may have additional indicium 311-312, encoding additional information comprising a further description of the permitted document services and, optionally, specific document service features that the bearer of the coupon is entitled to. In accordance with the invention, the coupon optionally, may further have human readable information 320.

FIG. 3 provides further detail for the FIG. 1 coupon 300. The printing, or marks, on the coupon comprise a machine-readable symbol or indicium 310. The machine-readable indicium 310 is an encoding of information that comprises a description of the permitted document services and document service features that a bearer of the coupon is entitled to. In accordance with the invention, the coupon optionally, may have additional indicia 311-312, encoding additional information comprising a further description of the permitted document services and, optionally, document service features that the bearer of the coupon is entitled to. In accordance with the invention, the coupon optionally, may further have human readable information 320.

Still referring to FIG. 3, in one embodiment the human-readable information 320 includes the account identity information and user identity information as described with reference to Table 1. In an alternate embodiment the human-readable information includes a description of all information relating to the document services and document service attributes to which a holder of the coupon is entitled. As one skilled in the art would recognize, other human-readable information, or combinations of human-readable information could be included on coupon 300 in accordance with the current invention.

Figure 4:
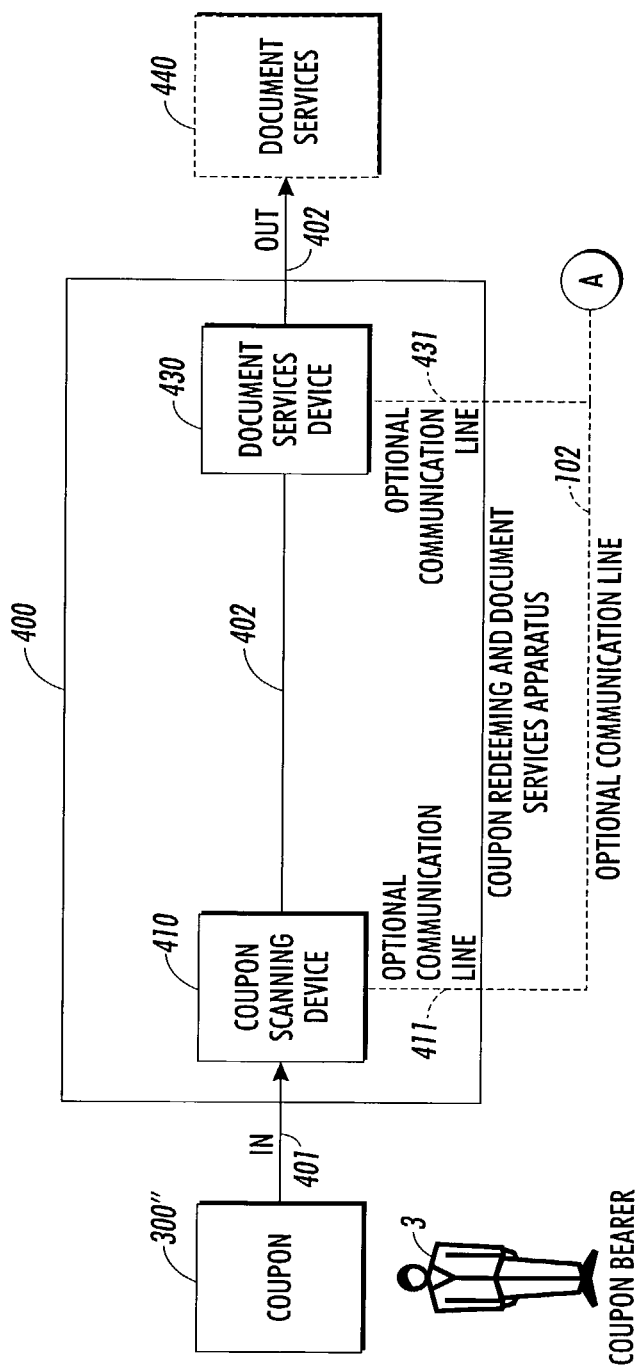
FIG. 4 provides further detail for the FIG. 1 coupon redeeming apparatus 400. As shown, coupon scanning device 410 scans coupon 300. The coupon scanning device decodes the indicia (reference FIG. 3, 310-312) and transmits the decoded indicia information to document services devices 430, via communications pathway 402. The document services device 430 provides document services 440 to coupon bearer 3. Optionally, the document services device 430 is in operative communication with the coupon dispensing apparatus (reference FIG. 1, 200) via optional communication line 431-102. Optionally, the coupon scanning device 410 is in operative communication with the coupon dispensing apparatus (reference FIG. 1, 200) via optional communication line 411-102.

Referring now to FIG. 4 there is provided further detail for the FIG. 1 coupon redeeming and document services apparatus 400. As shown, the coupon 300" is submitted to the input 401 of coupon scanning device 410 which scans coupon 300". The coupon scanning device 410 decodes the indicia (reference FIG. 3, 310-312). If the encoded information has been encrypted, using for example PGP, the coupon scanning device also decrypts the encrypted information. The coupon scanning device 410 transmits the decoded and decrypted indicia information to document services devices 430, via communications pathway 402. The document services device 430 provides document services 440 to coupon bearer 3. Optionally, the coupon is authenticated as described in more detail below. Optionally, the coupon redeeming and document services apparatus 400 may make a record of the document services actually provided as described in more detail below.

Referring now to FIG. 4, in a first embodiment of the coupon redeeming and document service apparatus 400, the coupon redeeming and document service apparatus 400 comprises a multifunction device. By a multifunction device it is meant the broad class of devices that comprises digital scanning and printing capability. Such devices are well known to those in the art and may optionally include components providing network connectivity, facsimile capability, electronic mail capability, local electronic file storage and retrieval capability, network electronic file storage and retrieval capability and document processing capability. By way of example and not limitation, one embodiment of a multifunction device is the Document Center 490, available from Xerox Corporation, 800 Long Ridge Road, Stamford Conn. 06904. In this embodiment the coupon scanning device 410, comprising the scanner and electronic scanning subsystems of the multifunction device, scans coupon 300". The coupon scanning device 410 decodes the indicia (reference FIG. 3. 310-312) and transmits the decoded indicia information to document services device 430, via communications pathway 402, comprising the internal communication pathway of the multifunction device. The document services device comprises any of the document service components of the multifunction device that provide functionality for document services. By way of example and not limitation, document services comprise printing, copying, faxing, electronic mail, electronic file access, scanning, document processing or any combination of these such as scan to file or scan to email. By way of example and not limitation, document processing comprises services such as optical character recognition.

Still referring to FIG. 4, in a second embodiment of the coupon redeeming and document services apparatus 400, the coupon redeeming and document services apparatus 400 comprises a multifunction device in operative communication with one or more servers. In this embodiment the coupon scanning device 410, comprises the multifunction device. The document services device 430 comprises the one or more servers. The one or more servers may comprise any of electronic mail server, facsimile server, electronic file storage server, print server, document processing server, or any other document services server as are well known to those skilled in the art. The coupon scanning device 410 decodes the indicia (reference FIG. 3. 310-312) and transmits the decoded indicia information to document services device 430, via communications pathway 402. In one embodiment communications pathway 402 may comprises a LAN network. In an alternate embodiment communications pathway 402 comprises a wireless network.

Again referring to FIG. 4, in a third embodiment of the coupon redeeming and document services apparatus 400, the coupon scanning device 410 comprises a scanner in operative communication with a computer. The coupon scanning device 410 decodes the indicia (reference FIG. 3. 310-312) and transmits the decoded indicia information to document services device 430, via communications pathway 402. In a first further embodiment, the document services device 430 comprises a printer in operative communication with the coupon scanning device 410 via communications pathway 402. Communications pathway 402 may comprise a direct physical connection such as is found with a printer locally connected to a computer, or it may comprise a network connection. In a second further embodiment, the document services device 430 may comprise one or more servers, in operative communication with the computer. The servers may be any of electronic mail server, facsimile server, electronic file storage server, print server, or document processing server, or any other document services server as are well known to those skilled in the art. In a third further embodiment, the document services device 430 may comprise a multifunction device in operative communication with the computer via communications pathway 402.

Still referring to FIG. 4, the recording of document services actually provided to a user is described in more detail. In one embodiment of the document services device 430, a record of the document services actually provided is stored internally. The record of document services actually provided may be stored in any suitable internal storage device, including, but not limited to electronic memory, magnetic media, optical media or any other suitable storage media. Document services device 430 is in operative communication with coupon dispensing apparatus (reference FIG. 1, 200) via optional communication line 431-102. Optional communication line 431-102 may be a LAN network, wireless network, or dedicated signal line. In one embodiment, the document services device 430 transmits a message comprising information describing the actual document services provided and coupon identifying information to the coupon dispensing apparatus (reference FIG. 1, 200) via optional communication line 431-102. Receiver (reference FIG. 1, 210) receives the message and updates the status information associated with the coupon request that is stored in optional coupon database (reference FIG. 1, 240). In an alternative embodiment the receiver (reference FIG. 1, 210) periodically requests document services device 430 to transmit information comprising a description of document services that have been actually provided to bearers of coupons. Numerous schemas for scheduling and transmission of messages are well known to those skilled in the art, and alternative embodiments in accordance with the current invention will be readily apparent to one skilled in the art.

Referring again to FIG. 4, the authentication of the coupon by the coupon redeeming and document services apparatus 400 is described in further detail. As described previously, coupon scanning device 410 scans coupon 300 and decodes the indicia (reference FIG. 3, 310-312). In one embodiment coupon scanning device 410 is in operative communication with the receiver (reference FIG. 2, 210) via optional communication line 411-102. Optional communication line 411-102 may be a LAN network, wireless network, or dedicated signal line. The coupon scanning device 410 transmits an authentication request message via optional communication line 411-102 to the receiver (reference FIG. 2, 210) requesting authentication of coupon 300. The authentication request message comprises coupon information derived from scanning the coupon 300 along with the request for authentication. By way of example, during the decoding, the coupon scanning device 410 may determine the user identity and account identity information encoded in the machine-readable indicia (reference FIG. 3, 310-312). Again, by way of example the coupon information transmitted to the receiver (reference FIG. 2, 210) may comprise a combination of account identifier information and a description of services enabled by the coupon 300. The receiver (reference FIG. 2, 210) may compare the coupon information provided in the authentication request to the information in the coupon database (reference FIG. 2, 240) to establish that the coupon 300 is not counterfeit. The receiver (reference FIG. 2, 240) transmits a message via optional communication lines 411-102 confirming or denying the coupon 300 is authentic.

Still referring to FIG. 4, in an alternative embodiment, the receiver (reference FIG. 2, 240) further establishes that document services authorized by the coupon 300 have not been previously provided. The receiver (reference FIG. 2, 240) compares the coupon information provided in the authentication request message to status information stored in the coupon database (reference FIG. 2, 240). The receiver (reference FIG. 2, 210) transmits a confirmation message to the coupon scanning device 410 via communication pathway 411-102 indicating whether the document services have previously been provided. In response to the message, the coupon scanning device provides or denies the coupon bearer 3 with access to the requested document services.

Figure 5:
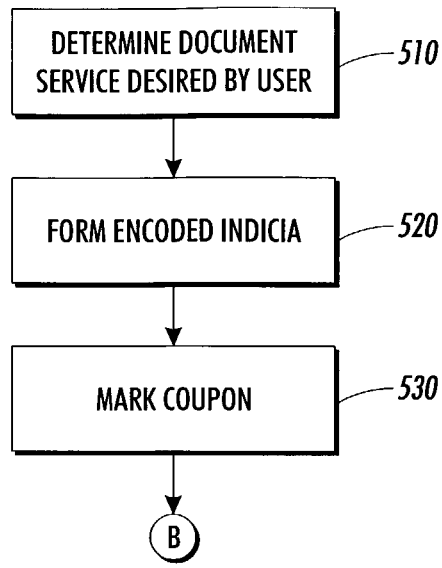
FIG. 5 and FIG. 6 depict a first embodiment of a method for providing document services in accordance with the invention. Also.
Figure 6:
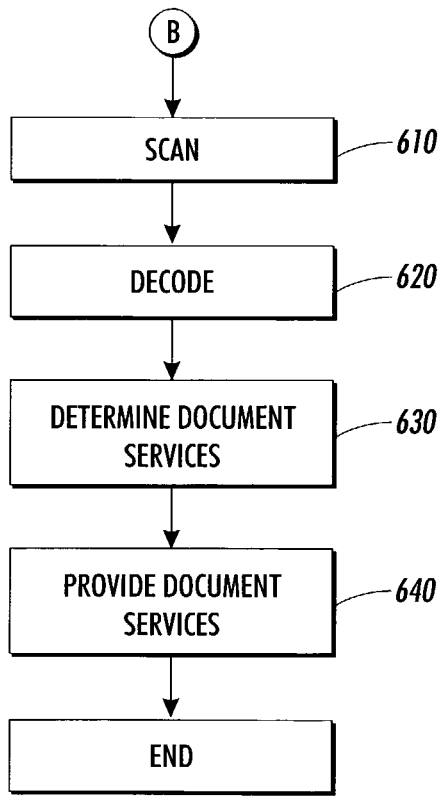

FIG. 5 and FIG. 6 depict a first embodiment of a method for providing document services in accordance with the invention. Also, FIG. 5 and FIG. 6 depict a first embodiment of a method of buying and selling document services. Also FIG. 5 and FIG. 6 depict a first embodiment of a method for forming and decoding a coupon for providing access to document services. The method described in FIG. 5 and FIG. 6 may be provided with the embodiments previously described, or alternative embodiments in accordance with this invention as will be readily apparent to one skilled in the art. Referring now to FIG. 5, the document services desired by the user are determined 510. The information derived from determining the document services desired by the user 510 is used to form encoded indicia 520. The encoded indicia (reference FIG. 3, 310-312) are printed onto the coupon during the step of marking the coupon 530. Referring now to FIG. 6, the coupon (reference FIG. 3, 300) is scanned 610 and the coupon information encoded in the coupon indicia (reference FIG. 3, 310-312) are decoded 620. The decoded coupon information is used to determine the requested document services 630, and provide document services to the user 640.

What is claimed is:

1. A system for providing at least one document service to a user, comprising:
    a coupon dispensing apparatus comprising:
        a receiver receiving a document services request from said user, storing said document services request in a coupon database, encoding said document services request, and forming a coupon message based on said document services request, and
        a printer receiving said coupon message, printing a coupon based on said coupon message, and dispensing said coupon to said user;
            said coupon bearing a machine-readable indicium that represents said at least one document service to which said user is entitled, and said at least one document service including any of printing, copying, faxing, scanning, electronic mail, electronic file access, scanning to email, scanning to file, and document processing; and
    a coupon redeeming and document services apparatus scanning and decoding said machine-readable indicium to determine and provide said at least one document service to said user;
        said coupon dispensing apparatus receiving a coupon-identifying and services-provided message, and updating status information, associated with said document services request, stored in said coupon database.

2. The system of claim 1, said coupon redeeming and document services apparatus establishing that all document services to which said user is entitled have not previously been used.

3. The system of claim 1, said coupon redeeming and document services apparatus scanning and decoding said machine-readable indicium and providing said at least one document service comprising a multifunction device.

4. The system of claim 3, said multi-function device communicating with a server.

5. The system of claim 1, said coupon dispensing apparatus delivering a digital representation of said coupon to said user, for dispensing by said user.

6. The system of claim 5, said coupon dispensing apparatus being delivered via a network.

7. The system of claim 5, said coupon dispensing apparatus being delivered via a wireless network.

8. A system for providing at least one document service to a user, comprising:
    a coupon dispensing apparatus comprising:
        a receiver receiving a document services request from said user, storing said document services request in a coupon database, encoding said document services request, and forming a coupon message based on said document services request, and
        a printer receiving said coupon message, printing a coupon based on said coupon message, and dispensing said coupon to said user;
            said coupon bearing a machine-readable indicium that represents said at least one document service to which said user is entitled, said at least one document service including any of printing, copying, faxing, scanning, electronic mail, electronic file access, scanning to email, scanning to file, and document processing, and said coupon further bearing human readable information including account identity information and user identity information; and
    a coupon redeeming and document services apparatus scanning and decoding said machine-readable indicium to determine and providing said at least one document service to said user, said coupon redeeming and document services apparatus transmitting a coupon-identifying and services-provided message to said coupon dispensing apparatus by a communication pathway, said coupon identifying and services-provided message both authenticating said coupon and identifying said at least one document service that is provided to said user;
        said coupon dispensing apparatus receiving said coupon-identifying and services-provided message, and updating status information, associated with said document services request, stored in said coupon database.

9. The system of claim 8, said coupon redeeming and document services apparatus establishing that all document services to which said user is entitled have not previously been used.

10. The system of claim 8, said coupon redeeming and document services apparatus scanning and decoding said machine-readable indicium and providing said at least one document service comprising a multifunction device.

11. The system of claim 10, said coupon dispensing apparatus delivering a digital representation of said coupon to said user, and for dispensing by said user.

12. A computer-implemented method for providing at least one document service to a user, comprising:
    receiving, by a computer-implemented coupon dispensing apparatus, a document services request from a user;
    storing, by said computer-implemented coupon dispensing apparatus, said document services request in a coupon database;
    encoding, by said computer-implemented coupon dispensing apparatus, said document service request;
    forming, by said computer-implemented coupon dispensing apparatus, a coupon message based on said document service request;
    receiving, by said computer-implemented coupon dispensing apparatus, said coupon message;
    printing, by said computer-implemented coupon dispensing apparatus, a coupon based on said coupon message;
    dispensing, by said computer-implemented coupon dispensing apparatus, said coupon to said user, said coupon bearing a machine-readable indicium that represents said at least one document service to which said user is entitled, and said at least one document service including any of printing, copying, faxing, scanning, electronic mail, electronic file access, scanning to email, scanning to file, and document processing;

scanning and decoding, by a computer-implemented coupon redeeming and document services apparatus, said machine-readable indicium borne by said coupon to determine and provide said at least one document service to said user;

transmitting, by said computer-implemented coupon redeeming and document services apparatus, a coupon-identifying and services-provided message to said coupon dispensing apparatus by a communication pathway, said coupon identifying and services-provided message both authenticating said coupon and identifying said at least one document service that is provided to said user; and receiving, by said computer-implemented coupon dispensing apparatus, said coupon-identifying and services-provided message, and updating status information, associated with said document services request, stored in said coupon database.

13. The method of claim 12, said dispensing includes marking said coupon to include a human readable information including a description of said at least one document service to which said user is entitled.

14. The method of claim 12, said coupon establishing that all document services to which said user is entitled have not previously been used.

15. A system for providing at least one document service to a user, comprising:
a coupon dispensing apparatus comprising:
a receiver receiving a document services request from said user, storing said document services request in a coupon database, encoding said document services request, and forming a coupon message based on said document services request, and
a printer receiving said coupon message, printing a coupon based on said coupon message, and dispensing said coupon to said user;
said coupon bearing a machine-readable indicium that represents said at least one document service to which said user is entitled, said at least one document service including any of printing, copying, faxing, scanning, electronic mail, electronic file access, scanning to email, scanning to file, and document processing, and describing permitted document services and specific document service features to which said user of said coupon is entitled, said specific document service features including a time period during which said user may use said permitted document services; and a coupon redeeming and document services apparatus scanning and decoding said machine-readable indicium to determine and providing said at least one document service to said user, said coupon redeeming and document services apparatus transmitting a coupon-identifying and services-provided message to said coupon dispensing apparatus by a communication pathway, said coupon identifying and services-provided message both authenticating said coupon and identifying said at least one document service that is provided to said user;

said coupon dispensing apparatus receiving said coupon-identifying and services-provided message, and updating status information, associated with said document services request, stored in said coupon database.

16. The system of claim 15, said specific document service features including a time at which said coupon becomes valid.

17. The system of claim 16, said specific document service features including a time at which said coupon expires.

18. The system of claim 15, said coupon redeeming and document services apparatus establishing that all document services to which said user is entitled have not previously been used.

19. The system of claim 18, said coupon redeeming and document services apparatus scanning and decoding said machine-readable indicium and providing said at least one document service comprising a multifunction device.

* * * * *